Patented May 6, 1941

2,241,237

UNITED STATES PATENT OFFICE 2,241,237

PROCESS FOR THE PREPARATION OF PSEUDO-CYANINE DYES

Leslie G. S. Brooker, Rochester, N. Y., assignor, by mesne assignments, to Eastman Kodak Company, Rochester, N. Y., a corporation of New Jersey No Drawing. Original application January 16, 1933, Serial No. 651,870. Divided and this application March 3, 1936, Serial No. 66,860

11 Claims. (Cl. 260—240)

This invention relates to a process for the preparation of cyanine dyes and in particular to a process for the preparation of pseudo-cyanine dyes. This application is a division of my co-pending application Serial No. 651,870, filed January 16, 1933.

It is well known that a number of cyanine dye condensations are brought about by using basic media or else by the use of inorganic alkalies. For instance, dyes of what is known as the pseudo-cyanine type have been prepared by the action of caustic potash, in absolute alcoholic solution, on a suitable mixture of quaternary salts of heterocyclic bases. (cf. Hamer,—J. Chem. Soc. 1928, 206).

It is an object of the present invention to provide a process for effecting pseudo-cyanine dye condensations in the presence of strong organic bases, such as trialkylamines (for example, triethylamine and triethanolamine) N-methylpiperidine, and the like. One advantage of this process is that in general the yields of products are much higher than when employing older methods, and in some cases products are obtainable which have heretofore been inaccessible using the older methods.

Distinction should be drawn between the isolated use of these strong organic bases in small quantities as catalysts and their employment in the present instance in molecular equivalent amounts. In the present case a perusal of the examples will show that the strong organic base is used to bind molecular proportions of acid, and the two types of reaction are, therefore, entirely different. In the present invention the bases are not used as catalysts, but as preferred acid-binding agents.

The bases which I use, such as n-butylamine, diethylamine, triethylamine, tributylamine, piperidine, N-methylpiperidine, triethanolamine, and the like, are of the substituted ammonia type and are recognized as being strong organic bases. These bases all have a dissociation constant substantially greater than that of pyridine. These bases may also be employed in the form of their salts with weak acids. For instance, guanidine carbonate is quite useful.

In pseudo-cyanine dye condensations higher yields are in general obtained when the strong organic base triethylamine is employed, compared with when potassium hydroxide is employed. (See, for instance, my co-pending application Serial No. 619,960, filed June 29, 1932, now United States Patent 2,143,839, dated January 17, 1939.)

For instance, in the preparation of 1,1'-diethylpseudo-cyanine iodide, a well known dye, the yield of unrecrystallized dye made using triethylamine amounts to as much as 80% of the theoretical, whereas the yield using caustic potash is decidely lower. In the preparation of 2,1'-diethylthiopseudocyanine iodide, when triethylamine is used (2.1 mols. of base to each 1 mol. of reacting salts) the yield obtained is around 90%. Using caustic potash under comparable conditions, the yield is appreciably less, being only from 70–75%. The corresponding selenium-containing dye may be similarly prepared.

The results are still more striking with 2,1'-diethyloxapseudocyanine iodide, a new dye. This dye, which possesses the following structure,

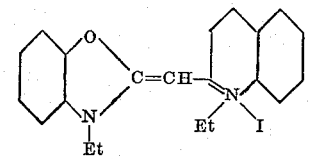

is obtainable when caustic potash (2 mols.) is allowed to react in absolute ethyl alcoholic solution on a hot mixture of 1-methylbenzooxazole ethiodide and 2-iodoquinoline ethiodide. The yield, however, in that case is small, being around 7%, and this remains roughly the same when sodium ethylate is used in place of the caustic potash. However, when triethylamine is used the yield of unrecrystallized, but substantially pure dye, is around 67%.

Of the various methods suggested in my co-pending application (Serial No. 619,960) for the preparation of dialkyl-$\begin{Bmatrix} ox \\ thi \\ selen \end{Bmatrix}$-azolopseudocyanine dyes, those methods in which triethylamine are used are preferred for the reason that the yields are usually better.

Usually triethylamine, tri-n-butylamine, β-diethylaminoethyl alcohol and such tertiary bases, give very high yields of the pseudo-cyanine dyes, and these bases are consequently preferred. Guanidine carbonate is quite good too for the preparation of 2,1'-diethylthiopseudocyanine iodide and of 1,1'-diethylpseudocyanine iodide, the yields being 85% and 80% respectively, under the conditions employed. This reagent, however, is less suitable for preparing 1,2'-diethyloxapseudocyanine iodide. Piperidine too, while giving about a 40% yield of 2,1'-diethylthiopseudocyanine iodide, gives a small yield of 2,1'-diethyloxapseudocyanine iodide or of 1,1'-diethylpseudocyanine iodide, but diethylamine gives an 80% yield of this first dye, a 20% yield of the second, and a 30% yield of the third dye.

The bases should be pure and anhydrous and the details of preparation of the dyes are furnished in the examples.

A further witness to the improvement in the method brought about by the uses of triethylamine and the like in condensations of the pseudo-cyanine type is afforded by the reaction between 2-iodoquinoline alkyl iodide and alpha-picoline alkyl iodide. When caustic potash is employed, a pseudo-cyanine cannot be isolated (Hamer and Kelly, J. C. S. 1931, 778, see also B. P. 369, 947, page 1, line 32) but when triethylamine is employed, the dye can readily be isolated.

Furthermore, it was not found possible (B. P. 369, 947, p. 1, l. 21) to prepare a cyanine dye of the constitution

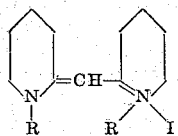

using potassium hydroxide, but using triethylamine this can be accomplished. Similarly it is also possible to prepare such pseudo-cyanine dyes as

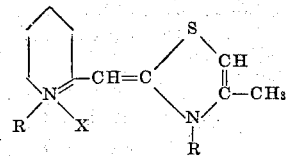

and

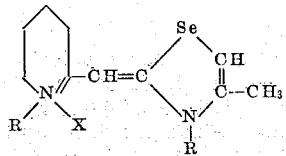

using 2-iodopyridine alkyl iodide and the appropriate quaternary salts of cyclic ammonium bases containing reactive methyl groups.

The dyes known as the isocyanines may also conveniently be prepared using the strong organic bases, and an example appears hereinafter showing how to prepare the dye 2,1'-diethylselenoisocyanine iodide.

The following examples serve to illustrate my invention, however, it is not intended that these illustrations limit my invention in any manner:

EXAMPLE 1

1,1'-diethylpseudocyanine iodide 3 parts of quinaldine ethiodide (1 mol.) are heated with 4.1 parts (1 mol.) of finely powdered 2-iodoquinoline ethiodide in 30 parts of boiling ethyl alcohol under reflux, and 2.1 (2.1 mols., i. e. 5% excess) parts of triethylamine added down the condenser and the whole well shaken and refluxed for twenty minutes. The dye forms rapidly, is filtered off when cold, washed with water, followed by a little alcohol and dried. The yield of dye is about 3.7 parts which is about 80% of the theoretical.

When tri-n-butylamine is employed (3.7 parts, 2.1 mols.) the conditions being otherwise identical, the yield of dye is 76%. The use of guanidine carbonate (1.9 parts, 1.05 mols.) results in a yield of about 80%.

EXAMPLE 2

2,1'-diethyloxapseudocyanine iodide 2.9 parts of 1-methylbenzoxazole ethiodide and 4.1 parts of 2-iodoquinoline ethiodide are treated in 20 parts of boiling absolute ethyl alcohol with 2.1 parts of triethylamine. The dye rapidly separates from the boiling solution and refluxing is continued for a further ten minutes. The washed dye weighs 3 parts (67%) and crystallizes from methyl alcohol in orange needles. Triethanolamine (3.15 parts) gives a yield of about 2 parts of dye and β-diethylaminoethyl alcohol (2.5 parts) gives about the same yield.

EXAMPLE 3

2,1'-diethylthiopseudocyanine iodide 3.5 parts of 1-methylbenzothiazole etho-p-toluenesulfonate and 4.1 parts of 2-iodoquinoline ethiodide are treated in 30 parts of boiling ethyl alcohol with 2.1 parts of triethylamine and the mixture refluxed for twenty minutes. The dye separates out and after washing and drying is obtained in a yield of about 90%.

β-Diethylaminoethyl alcohol (2.5 parts) similarly used results in a yield of 90%. Guanidine carbonate (1.9 parts) gives a yield of 86% and diethylamine (1.55 parts) gives a yield of 79%.

EXAMPLE 4

7-methyl-1',2-diethylthiopseudocyanine iodide 3.2 parts (1 mol.) of 1-ethylbenzothiazole ethiodide (made by condensing equivalent amounts of 1-ethylbenzothiazole and ethyl iodide together in the usual way, and recrystallizing the product), 4.1 parts (1 mol.) of 2-iodoquinoline ethiodide and 18 parts of absolute ethyl alcohol are refluxed together with 2 parts (2 mols.) of triethylamine for 15 minutes. Crystals of the dye separate during the reaction and are filtered off on cooling and washed free from a soluble purplish impurity with a little acetone. The dye may be recrystallized from methyl alcohol and is obtained as small scarlet needles which give an orange solution with the solvent.

EXAMPLE 5

2,1'-diethylselenopseudocyanine iodide 2 parts (1 mol.) of 1-methylbenzoselenazole are heated with 2 parts (1 mol.) of ethyl p-toluenesulfonate at 100° C. for 30 hours. The product, a somewhat brownish viscous mass, is dissolved in 16 parts of hot absolute ethyl alcohol, 41 parts (1 mol.) of 2-iodoquinoline ethiodide added, the whole brought to boiling at 2.1 (2.1 mols.) parts of triethylamine added. The dye rapidly separates but heating is continued for 20 minutes. On cooling the dye is removed, washed and purified by crystallization from methyl alcohol in which it gives an orange solution. The dye forms scarlet needles with a blue reflex.

EXAMPLE 6

1,3,3,1'-tetramethylindopseudocyanine iodide 3 parts (1 mol.) of 2,3,3-trimethylindolenine methiodide and 4.1 parts (1 mol.) of 2-iodoquinoline ethiodide were condensed together refluxing the mixture in 20 parts of absolute ethyl alcohol together with 2.1 parts (2.1 mols.) of triethylamine for 25 minutes. The mixture was cooled, the dye precipitated with ether and washed with water followed by a little acetone. The dye was obtained as a dull brown powder and weighed 3.2 parts (72%). It could be recrystallized from methyl alcohol and formed reddish brown crystals. The yield of dye obtained is much higher than when potash is used.

EXAMPLE 7

*1,1'-dimethyl-5,6-benzopyrido-2,2'-cyanine iodide*

2.35 parts (1 mol.) of alphapicoline methiodide, 4 parts (1 mol.) of 2-iodoquinoline methiodide are heated for 10 minutes under reflux with 2.1 parts (2.1 mols.) of triethylamine and 20 parts of ethyl alcohol. A little unchanged 2-iodoquinoline methiodide is removed by filtration and the solution allowed to cool. The dye separates out together with water soluble products and is purified by washing with water. The yield is around 19%. It crystallizes from methyl alcohol in brown crystals.

EXAMPLE 8

*2,1'-diethylthio-2'-pyridocyanine iodide*

3.5 parts (1 mol.) of 1-methylbenzothiazole etho-p-toluenesulfonate and 3.6 parts (1 mol.) of 2-iodopyridine ethiodide are heated under reflux for 20 minutes with 12 parts of ethyl alcohol and 2.1 parts (2 mols.) of triethylamine. The dye was filtered off when cold. The crude dye contained a sparingly soluble by-product and the dye desired was extracted from this by using a small quantity of hot methyl alcohol. After one more recrystallization, the dye was pure.

EXAMPLE 9

*1,1'-dimethyl-2,2'-pyridocyanine iodide*

2.4 parts (1 mol.) of alphapicoline methiodide, 3.5 parts (1 mol.) of 2-iodopyridine methiodide, 16 parts of absolute ethyl alcohol and 2.1 parts (2.1 mols.) of triethylamine are refluxed together. The dye begins to separate in glittering crystals from the boiling reaction mixture after 3 or 4 minutes, and refluxing is continued for 20 minutes. The dye is removed and is purified by washing with acetone followed by water, and is obtained in beautiful light brown platelets with a bright pale greenish reflex. It may be recrystallized from methyl alcohol when it is obtained in brown granular crystals with a green reflex. The color of the solution is golden-yellow.

EXAMPLE 10

*4,1'-dimethyl-3-ethylthiazolo-2'-pyridocyanine iodide*

2.7 parts (1 mol.) of 2,4-dimethylthiazole ethiodide, 3.5 parts (1 mol.) of 2-iodopyridine methiodide, 16 parts of absolute ethyl alcohol are brought to boiling, 2.1 parts (2.1 mols.) of triethylamine added and the whole refluxed for 20 minutes. The dye rapidly separates from the boiling solution as a yellow-orange powder. It is removed, washed with acetone followed by water and may then be recrystallized from methyl alcohol in which it gives a yellow-orange solution. It separates as yellow needles or as orange needles with a bright greenish-yellow reflex, or as a mixture of the two forms.

EXAMPLE 11

*3,4,1'-trimethylselenazolo-2'-pyridocyanine iodide*

2.4-dimethylselenazole metho-p-toluenesulfonate (1 mol.) is prepared by heating 1.6 parts (1 mol.) of 2,4-dimethylselenazole with 1.9 parts (1 mol.) of methyl p-toluenesulfonate for several hours at 100° C. The salt soon solidifies and is dissolved in 12 parts of hot absolute ethyl alcohol, 3.5 g. (1 mol.) of 2-iodopyridine methiodide added, the whole boiled, 2.1 parts (2.1 mols.) of triethylamine added and refluxed for 20 minutes. The dye rapidly separates from the boiling solution. It is removed, washed with acetone followed by water and is obtained as a light-brown crystalline powder. It crystallizes from methyl alcohol, in which it gives a deep yellow-orange solution, in glittering minute brown crystals.

If an equivalent amount (1 mol.) of 2,4-dimethyloxazole be used in place of the 2,4-dimethylselenazole, then in the first stage of the synthesis 2,4-dimethyloxazole metho-p-toluenesulfonate is formed, and in the final stage 3,4,1'-trimethyloxazolo-2'-pyridocyanine iodide. This compound crystallizes in beautiful yellow needles.

From the foregoing description and numerous examples it will be apparent that the use of a strong organic base, and particularly a strong tertiary organic base, as a condensing agent for the preparation of pseudo-cyanine dyes has a broad and general application. By its use the yields of a large number of pseudo-cyanine dyes is vastly improved and the syntheses of a number of dyes which have heretofore defied preparation is made possible. While many more examples could be given, the foregoing are thought to be sufficient to teach the application of my method to pseudo-cyanine dye condensations in general. It is a striking fact that the simplest pseudo-cyanine dyes having the general formula

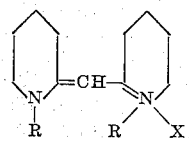

are rendered accessible by this method.

While I have described the use of a considerable number of strong organic bases, it will be apparent to those skilled in the art that any strong organic base having similar properties may likewise be employed. In the claims appended hereto, when the term "strong organic base" is used, it is not intended to include bases such as pyridine and quinoline, but only intended to include those organic bases having a dissociation constant substantially greater than that of pyridine. Furthermore, I employ these strong organic bases in molecular equivalent quantities rather than in traces as catalysts.

More specifically, it will be observed that the strong organic bases which I prefer to employ form a group which, in general, comprises aliphatic bases of the substituted ammonia type known as aliphatic amines. These amines may be primary, secondary or tertiary amines, but are preferably tertiary amines. It is also convenient to employ some of these bases in the form of their salts with weak acids, such as carbonic acid. There is a great variety of such strong organic bases available, and it is not intended that the concept should be applied too restrictively. For instance, guanidine (in the form of its carbonate) is effective, while at the same time it is not strictly regarded as an aliphatic amine.

All of the dyes herein described have the property to a greater or lesser degree of sensitizing photographic emulsions, such as gelatinosilver-halide emulsions, so as to make these emulsions responsive to light in various portions of the spectrum.

What I claim and desire to secure by Letters Patent of the United States is:

1. In a process for preparing a pseudocyanine dye wherein one molecular proportion of a cyclammonium quaternary salt containing a reactive alkyl group in the alpha position is condensed with one molecular proportion of a cyclammonium alkyl quaternary salt selected from the group consisting of 2-halogeno pyridinium alkyl quaternary salts and 2-halogeno quinolinium alkyl quaternary salts and the elements of acid are eliminated from the condensing cyclammonium alkyl quaternary salts, the step which comprises employing a tertiary organic base having a dissociation constant substantially greater than that of pyridine, in quantity sufficient to bind the elements of acid eliminated.

2. In a process for preparing a pseudocyanine dye wherein one molecular proportion of a cyclammonium quaternary salt containing a reactive alkyl group in the alpha position is condensed with one molecular proportion of a cyclammonium alkyl quaternary salt selected from the group consisting of 2-halogeno pyridinium alkyl quaternary salts and 2-halogeno quinolinium alkyl quaternary salts and the elements of acid are eliminated from the condensing cyclammonium alkyl quaternary salts, the step which comprises employing a trialkylamine having a dissociation constant substantially greater than that of pyridine, in quantity sufficient to bind the elements of acid eliminated.

3. In a process for preparing a pseudocyanine dye wherein one molecular proportion of a cyclammonium alkyl quaternary salt containing a reactive methyl group in the alpha position is condensed with one molecular proportion of a cyclammonium alkyl quaternary salt selected from the group consisting of 2-halogenopyridinium alkyl quaternary salts and 2-halogenoquinolinium alkyl quaternary salts and the elements of acid are eliminated from the condensing alkyl quaternary salts, the step which comprises employing a tertiary organic base having a dissociation constant substantially greater than that of pyridine, in quantity sufficient to bind the elements of acid eliminated.

4. In a process for preparing a pseudocyanine dye wherein one molecular proportion of a cyclammonium alkyl quaternary salt containing a reactive methyl group in the alpha position is condensed with one molecular proportion of a cyclammonium alkyl quaternary salt selected from the group consisting of 2-halogenopyridinium alkyl quaternary salts and 2-halogenoquinolinium alkyl quaternary salts and the elements of acid are eliminated from the condensing alkyl quaternary salts, the step which comprises employing a trialkylamine having a dissociation constant substantially greater than that of pyridine, in quantity sufficient to bind the elements of acid eliminated.

5. In a process for preparing a pseudocyanine dye wherein one molecular proportion of a cyclammonium alkyl quaternary salt containing a reactive methyl group in the alpha position is condensed with one molecular proportion of a 2-iodoquinolinium alkyl quaternary salt and the elements of acid are eliminated from the condensing alkyl quaternary salts, the step which comprises employing a tertiary organic base having a dissociation constant substantially greater than that of pyridine, in quantity sufficient to find the elements of acid eliminated.

6. In a process for preparing a pseudocyanine dye wherein one molecular proportion of a 1-methylbenzothiazole alkyl quaternary salt is condensed with one molecular proportion of a 2-iodoquinolinium alkyl quaternary salt and the elements of acid are eliminated from the condensing alkyl quaternary salts, the step which comprises employing a trialkylamine having a dissociation constant substantially greater than that of pyridine, in quantity sufficient to bind the elements of acid eliminated.

7. In a process for preparing a pseudocyanine dye wherein one molecular proportion of a 1-methylbenzothiazole alkiodide is condensed with one molecular proportion of a 2-iodoquinoline alkiodide and the elements of acid are eliminated from the condensing alkiodides, the step which comprises employing a trialkylamine having a dissociation constant substantially greater than that of pyridine, in quantity sufficient to bind the elements of acid eliminated.

8. In a process for preparing a pseudocyanine dye wherein one molecular proportion of 1-methylbenzothiazole ethiodide is condensed with one molecular proportion of 2-iodoquinoline ethiodide and the elements of acid are eliminated from the condensing ethiodides, the step which comprises employing a trialkylamine having a dissociation constant substantially greater than that of pyridine, in quantity sufficient to bind the elements of acid eliminated.

9. In a process for preparing a pseudocyanine dye wherein one molecular proportion of 1-methylbenzothiazole ethiodide is condensed with one molecular proportion of 2-iodoquinoline ethiodide and the elements of acid are eliminated from the condensing ethiodides, the step which comprises employing triethylamine to bind the elements of acid eliminated.

10. In a process for preparing a pseudocyanine dye wherein one molecular proportion of a 1-methylbenzoselenazole alkiodide is condensed with one molecular proportion of a 2-iodoquinoline alkiodide and the elements of acid are eliminated from the condensing alkiodides, the step which comprises employing a trialkylamine having a dissociation constant substantially greater than that of pyridine, in quantity sufficient to bind the elements of acid eliminated.

11. In a process for preparing a pseudocyanine dye wherein one molecular proportion of an alpha picoline alkiodide is condensed with one molecular proportion of a 2-iodopyridine alkiodide and the element of acid are eliminated from the condensing alkiodides, the step which comprises employing a trialkylamine having a dissociation constant substantially greater than that of pyridine, in quantity sufficient to bind the elements of acid eliminated.

LESLIE G. S. BROOKER.